2,938,042

ACYCLIC AND AROMATIC SULPHONYLPHENYL ISOTHIOCYANATES

Herbert Aubrey Stevenson, John Ray Marshall, and Anthony Frederick Hams, Nottingham, England, assignors to Boots Pure Drug Company Limited, Nottingham, England, a British company No Drawing. Filed Jan. 29, 1957, Ser. No. 636,874

Claims priority, application Great Britain Feb. 3, 1956

10 Claims. (Cl. 260—397.6)

This invention relates to new organic isothiocyanates which have been found to possess valuable properties.

The invention consists in compounds of the general formula:

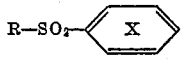 (I)

in which the phenyl nucleus X is substituted by at least one isothiocyanato radical and may additionally be substituted by one or more halogen atoms or alkyl radicals and R represents a methyl radical, an alkenyl radical, a halogenated alkenyl radical, an alkyl radical containing at least three carbon atoms or an alkyl radical substituted by one or more halogen atoms, acyl radicals, phenyl radicals or halogenated phenyl radicals.

We have now found that dusts, dispersions, emulsions, smokes and aerosols of the compounds of the above general Formula I have properties which render them valuable for the control of fungi for example *Venturia inaequalis, Botrytis cinerea, Sclerotinia fructigena, Tilletia caries, Pythium debaryanum, Corticium solani, Podosphaera leucotricha* and *Cladosporium fulvum*. Our invention consists therefore in the compounds of the above general Formula I and in compositions which contain as active ingredient a compound of the above general formula together with a diluent or carrier.

The compounds of the invention may be prepared by methods which are well-known in the art for the synthesis of organic isothiocyanates. Thus the compounds of the invention may be prepared by the action of thiophosgene on the corresponding amines of the general formula:

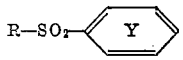 (II)

in which R is as hereinbefore defined and the phenyl nucleus Y is substituted by at least one amino group and may additionally be substituted by one or more halogen atoms or alkyl radicals. The thiophosgene may be used as such or prepared in situ preferably by reduction of trichloromethansulphenyl chloride with stannous chloride as described by Connolly and Dyson (J.C.S. 1935, p. 679).

The dispersions having a solid dispersed phase according to the invention may comprise the active ingredient in combination with a dispersing agent and/or a suspending agent in aqueous medium. For convenience the preparation may consist of active ingredient admixed with a dispersing agent and/or a suspending agent such that a dispersion is formed when the mixture is added to water. To facilitate the formation of a dispersion in this manner, the preparation to be diluted may also contain a water-miscible organic solvent, for example, acetone. The dispersions according to the invention also include suspensions in which the solid dispersed phase is admixed with an aqueous oil emulsion, the active ingredient being substantially insoluble in the oil thereof, which oil is preferably a non-volatile oil, for example, liquid paraffin. In such compositions the diluent or carrier comprises a dispersing and/or suspending agent, an emulsifying agent and a non-volatile oil.

The emulsions according to the invention may comprise the active ingredient in combination with an emulsifying agent and organic solvent, for example, xylene or an aromatic solvent boiling within the range 80–300° C. It may be advantageous to add a non-volatile vegetable or mineral oil such as liquid paraffin to act as an activator and/or sticker. The emulsion composition according to the invention may also contain a wetting agent. For convenience the composition may consist of the active ingredient admixed with or in solution in an organic solvent as hereinbefore specified together with an emulsifying agent, and if desired, a wetting agent such that an emulsion is formed on admixing the composition with water. Such compositions also form part of the present invention. The aqueous dispersions and emulsions herein described may be diluted with water before application to obtain a final concentration of the active ingredient within the range 0.001–10% w./v. but the invention is not limited to compositions which contain this concentration of the active ingredient; the concentration of the solutions which are employed depends upon the requirements of the particular spraying machine which is to be used.

Dispersions of the active ingredient in which the carrier is a pulverulent solid diluent also form part of the present invention. Such dispersions may contain up to 50% w./v. of the active ingredient.

We have found that it is possible to employ the compound of the invention in the form of smokes and aerosols. This method of application is very convenient when the plants, which it is desired to treat for the control of the fungi, are located in an enclosed area, for example, in a greenhouse.

Accordingly our invention also comprises compositions for the preparation of fungicidal smokes and aerosols which contain as active ingredient a compound of the general Formula I.

In the preparation of compositions suitable for dispersion as aerosols which contain as active ingredient compounds of the above general Formula I, the active ingredient may be dissolved in a volatile solvent such as acetone. Alternatively the active ingredient may be dissolved in a high boiling aromatic solvent such as xylene or a non-volatile oil such as vegetable oil together with a supplementary solvent such as cyclohexanone or acetone if desired. Such compositions are readily dispersed as aerosols either by mechanical means or by incorporating therein a volatile propellant such as Freon (a mixture of chlorofluoro derivatives of methane and ethane).

Compositions suitable for the generation of fungicidal smokes comprise the active ingredient in association with an ignitable slow burning composition such that a smoke containing the active ingredient is generated on ignition.

The wetting and emulsifying agents which are employed in the compositions of the invention should preferably be free of amino groups and alcoholic groups so as to avoid the possibility of condensation taking place between the active ingredient and one of the aforementioned groups with the formation of thioureas and thiourethanes respectively.

In the case of compositions which are to be subjected to prolonged storage and which contain a compound of the invention dissolved in an organic solvent the latter should preferably be substantially anhydrous as the presence of water in such solutions tends to cause hydrolysis of the active ingredient on storage.

Other insecticides and fungicides such as D.D.T. benzene hexachloride and sulphur may be incorporated in the compositions of the invention before application of the latter to the plants.

The compounds of the invention have been demonstrated to possess fungicidal activity in tests carried out in the following manner:

LABORATORY TESTS (1) *Spore germination test.*—The test is based on the recommendations of the American Phytopathological Committee (1943). On a glass slide a deposit of known weight of the compound under test is formed by allowing an acetone solution of known concentration of the compound to evaporate. Spores of one of a number of pathogenic fungi in aqueous suspensions are set on these deposits to germinate and the percentage germination is noted. In Table I the results of these tests are shown, the "Approximate L.D. 50" being the concentration in parts per million of the acetone solution of the substance under test which it is calculated would inhibit 50% of the spores from germinating; the higher the value of the L.D. 50 the lower the activity of the compound. The figures shown in the column headed "Derived L.D. 50" are obtained by suspending spores in a series of solutions of graded dilution of the substance under test and assessing the concentration causing 50% inhibition of germination. The test solutions are prepared by dilution with water of a 5% w./v. solution of the substance in acetone. In Table I symbols B.C., S.F., C.F., and V.I. represent the fungi *Botrytis cinerea*, *Sclerotinia fructigena*, *Cladosporium fulvum* and *Venturia inaequalis* respectively.

Table I

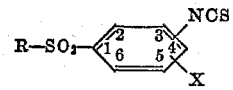

| R | X | Position of —NCS in ring | Approximate L.D. 50 | | | | Derived L.D. 50 | |
| --- | --- | --- | --- | --- | --- | --- | --- | --- |
| | | | B.C. | S.F. | C.F. | V.I. | V.I. | B.C. |
| Methyl | H | 4 | 12 | 2 | 1.5 | <1 | 0.17 | |
| Methyl | 4-Cl | 3 | 2 | 1.5 | 1.5 | <1 | 0.55 | |
| Ethyl | H | 4 | 2 | <1 | 8 | <1 | 0.46 | |
| n-Propyl | H | 4 | 2 | <1 | <1 | 1.5 | | |
| iso Propyl | H | 4 | 6 | <1 | 1.5 | 1.5 | | |
| sec Butyl | H | 4 | 3 | <1 | 1.5 | 1.5 | | |
| n-Amyl | H | 4 | 3 | <1 | <1 | <1 | 0.34 | |
| Allyl | H | 4 | 6 | <1 | <1 | 1 | | |
| 3-Methylbutyl | H | 4 | 1.5 | <1 | <1 | <1 | 0.49 | |
| n-Octyl | H | 4 | 400 | 80 | 3 | 80 | | |
| iso Butyl | H | 4 | 3 | 3 | 1.5 | <1 | 0.56 | |
| n-Hexyl | H | 4 | 1.5 | 1.5 | 1.5 | <1 | 0.71 | |
| Benzyl | H | 4 | <1 | 1.5 | 3 | <1 | 0.49 | 0.68 |
| n-Heptyl | H | 4 | 300 | 400 | 3 | 2 | 1.8 | |
| 3-Chloroallyl | H | 4 | 6 | 2 | 1.5 | 6 | | |
| tert-Butyl | H | 4 | 4 | 2 | 60 | 7 | | |
| 2-Phenethyl | H | 4 | 1.5 | 1.5 | 1.5 | 1.5 | | |
| Phenacyl | H | 4 | 1.5 | <1 | 1.5 | <1 | 0.68 | |
| Chloromethyl | H | 4 | <2 | <1 | <1 | <1 | 0.21 | |
| 2-Chloroethyl | H | 4 | 6 | 1.5 | 200 | 1.5 | | |
| 1-Methylbutyl | H | 4 | 3 | 6 | 6 | <1 | 0.6 | |
| Dichloromethyl | H | 4 | 6 | <2 | 12 | 1.5 | | |
| Ethyl | 4-Cl | 3 | <2 | <2 | 1.5 | 1.5 | | |
| Methyl | H | 3 | 6 | 1.5 | 1.5 | 1.5 | | |
| Ethyl | 4-CH₃ | 3 | 6 | 1.5 | 40 | 6 | | |
| Methyl | 4-CH₃ | 3 | >400 | <2 | 3 | 2 | | |
| n-Propyl | 4-Cl | 3 | 3 | <1 | <1 | <1 | | |
| n-Propyl | 4-CH₃ | 3 | 60 | 6 | 3 | 12 | | |
| Bromomethyl | H | 4 | 6 | 2 | 1.5 | <1 | | |
| n-Butyl | 4-Cl | 3 | 6 | 2 | 1.5 | <1 | | |
| iso Propyl | 4-Cl | 3 | <2 | <1 | <1 | <1 | | |
| iso Butyl | 4-Cl | 3 | 6 | 1.5 | 1.5 | 1.5 | | |
| 3-Methylbutyl | 4-Cl | 3 | 400 | <1 | 1.5 | <1 | | |
| 4-Chlorobenzyl | H | 4 | 400 | >400 | 400 | <1 | 0.70 | |

(2) *Bunt of wheat test.*—A number of the compounds of the invention have been tested in the following manner. Seeds of wheat are infected with *Tilletia caries* and dressed with dusts containing 10% w./w. of the substance under test in kaolin at the rate of 2 ozs. of dust per bushel of seed. The dressed seeds are incubated for 5 days on agar and at the end of this time the seeds are removed from the agar and the spores of the fungus remaining on the agar surface are examined for germination. The results obtained in this test with a number of the compounds of the invention are shown in Table II.

(3) *Impregnation test.*—In this test agar plates are prepared in which the agar contains the substance under test at a concentration of 10 parts per million the substance being introduced into the hot agar from an acetone solution before the plate is poured. The centre of each plate is inoculated with *Botrytis cinerea* and the plates are incubated; the size of the colony is measured diametrically at 3 day intervals and is compared with untreated controls. The results obtained in this test with a number of the compounds of the invention are shown in Table II.

(4) *Damping-off fungi trials.*—In this test cubes of agar containing mycelium of either *Pythium debaryanum* or *Corticium solani* are coated with dusts containing 0.5% w./w. of the substance under test in kaolin and placed in the centre of agar plates. A measure of the activity of the compounds under test is obtained by observation of the diameter of the colonies at intervals. Results obtained in this test with a number of the compounds of the invention are shown in Table II.

Table II

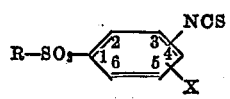

| R | X | Position of —NCS in ring | Bunt of Wheat | Impregnation Test | Damping Off Test | |
|---|---|---|---|---|---|---|
| | | | | | Pythium debaryanum | Corticium solani |
| Methyl | H | 4 | | | C | P |
| Methyl | 4-Cl | 3 | | | O | C |
| n-Propyl | H | 4 | C | | O | |
| n-Butyl | H | 4 | C | | P | C |
| iso Propyl | H | 4 | | | O | C |
| sec. Butyl | H | 4 | C | | C | C |
| Allyl | H | 4 | C | | | C |
| 3-Methylbutyl | H | 4 | O | | | |
| n-Octyl | H | 4 | O | | | |
| iso Butyl | H | 4 | O | | | C |
| 2-Phenethyl | H | 4 | P | | | |
| Phenacyl | H | 4 | P | | | |
| Chloromethyl | H | 4 | P | C | | C |
| 2-Chloroethyl | H | 4 | O | | O | |
| Ethyl | 4-Cl | 3 | P | | P | C |
| Methyl | H | 3 | | P | C | O |
| Ethyl | 4-CH₃ | 3 | | | | C |
| Methyl | 4-CH₃ | 3 | C | | | |
| n-Propyl | 4-Cl | 3 | O | | | |
| n-Propyl | 4-CH₃ | 3 | P | | | P |
| Bromomethyl | H | 4 | C | | | |
| n-Butyl | 4-Cl | 3 | | C | | |
| iso Propyl | 4-Cl | 3 | C | | C | |

Key: C=complete control; P=50% or more control.

EXTENSION TESTS

A number of compounds have been subjected to further tests which are designed to ascertain the activities of the compounds against various fungi living on a plant host.

(1) *Tomato leaf mould (Cladosporium fulvum).*— This test is carried out using young tomato plants growing in pots in a glasshouse. A group consisting of five tomato plants is sprayed to run off with an aqueous suspension containing 0.05% w./v. of the compound under test. When the spray deposit is dry the plants are enclosed in a chamber in a moist atmosphere at a temperature of 75° F. and the plants are inoculated with spores of *Cladosporium fulvum*. A group of untreated plants is inoculated in a similar manner. The plants are kept under these conditions for 3 days and are then kept under normal glasshouse conditions for 15–18 days. At the end of this time three leaves are removed from each plant and examined; the number of lesions per leaf is counted. The average number of lesions per leaf in the treated plants is expressed as a percentage of the average number of lesions per leaf in the untreated control plants and this figure is designated "percentage infection."

Substances which show activity in the above spray test are submitted to a further test which employs the active substance in the form of an aerosol. A group of five young tomato plants is placed in a fumigation chamber of a volume of 11 cu. ft. and 0.125 cc. of a 5% w./v. solution of the substance under test in acetone is dispersed into the chamber by means of a paint spray gun. The aerosol cloud is allowed to settle for 3 hours after which the plants are removed from the fumigation chamber, inoculated with spores of *Cladosporium fulvum* and the infection assessed as described above in the spray test. The results obtained in the above tests are summarised in Table III.

(2) *Groundsel mildew.*—In this test groups of 5 groundsel plants growing in pots in a glasshouse are sprayed to run off with an aqueous suspension containing 0.05% w./v. of the compound under test and as soon as the spray deposit is dry the plants are artificially infected with *Oidium sp.* under similar conditions to those described for the tomato leaf mould test. The degree of control of the mildew by the treatment is assessed by a visual examination of the plants and the results are expressed in Table III on an arbitary scale of very good control (VG), good control (G), fair control (F), and poor control (P).

(3) *Apple mildew (Podosphaera leucotricha).*—This test is carried out in a similar manner to that described above for groundsel mildew employing apple seedlings growing in pots in a glasshouse. The results are expressed in Table III in like manner to those obtained in the Groundsel mildew test.

(4) *Apple scab (Venturia inaequalis).*—The activity of a number of the compounds of the invention has been assessed by small scale field trials. Two trials have been carried out as follows.

*Site A.*—In this trial the trees were two year old Bramleys planted close together in a nursery and randomised blocks each containing four trees were used for each substance under test. The trees were sprayed to run off six times between April and July 1956, with aqueous suspensions containing 0.1% w./v. of active ingredient. An assessment of the effectiveness of the compounds under test was made in the middle of August by collecting 100 leaves from each tree and measuring the percentage area of each infected by the fungus. The results quoted in Table III are averages of the percentage areas infected on the 400 leaves collected from each block of trees. For the purposes of comparison control blocks of trees which received no treatment were similarly examined, the average degree of infection in the controls being 1.2%.

*Site B.*—In this trial 8–10 year old Lord Lambourne trees were used and each substance under test was applied to four trees. The trial was carried out in exactly the same manner as that conducted in Site A. The results obtained are summarised in Table III. The average degree of infection on the leaves of control trees was 1.58%.

(5) *Celery leaf spot.*—The activity of some of the compounds of the invention against *Septoria apiigraveolentis* on celery plants was determined in a similar manner to that described for the first of the two tomato leaf mould tests. The results are summarised in Table III and expressed in the same manner as those obtained in the tomato leaf mould tests.

Table III

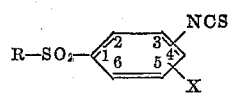

| R | X | Position of —NCS in ring | Tomato Leaf Mould (percent infection) | | Groundsel Mildew | Apple Mildew | Apple Scab | | Celery Leaf Spot (percent infection) |
|---|---|---|---|---|---|---|---|---|---|
| | | | Spray | Aerosol | | | Percent infection | Site | |
| Methyl | 4-Cl | 3 | 0 | 42 | G | VG | 0.36 | A | |
| n-Propyl | H | 4 | 0 | 13 | VG | P | 0.36 | A | |
| n-Amyl | H | 4 | 0 | 40 | G | F | 0.09 | B | 3.2 |
| 3-Methylbutyl | H | 4 | 1 | 47 | G | F | 0.28 | B | 0.3 |
| n-Hexyl | H | 4 | 0 | 13 | G | P | 0.59 | B | |
| Benzyl | H | 4 | 0 | 8 | F | P | 0.16 | B | 1.7 |
| Phenacyl | H | 4 | 2 | 13 | F | P | 0.16 | B | 1.4 |
| Chloromethyl | H | 4 | 0 | 8 | F | P | 0.03 | B | 1.6 |
| 4-Chlorobenzyl | H | 4 | 18 | 25 | P | | 0.57 | A | 6.0 |

The starting materials used in the preparation of the active compounds of the invention may be prepared as follows:

PREPARATION 1 p-Chlorophenyl ethyl sulphide is prepared in the following manner. To a mixture of 144.5 grams of p-cholorobenzenethiol, 40 grams of sodium hydroxide, 60 cc. of water and 500 cc. of alcohol there is added 109 grams of ethyl bromide gradually, and the mixture so obtained is heated under reflux for 15 minutes. The reaction product is cooled and extracted with ether (3 x 250 cc.). The ether extracts are combined and the ether removed by distillation and the residue distilled under reduced pressure. There is thus obtained p-chlorophenyl ethyl sulphide in the form of an oil which has a boiling point of 103° C./2 mm. (Found: C, 55.3; H, 5.2. $C_8H_9ClS$ requires C, 55.65; H, 5.2%.)

In exactly similar manner the following compounds are prepared from the appropriately substituted benzenethiol and the appropriate bromoalkane.

p-Chlorophenyl n-propyl sulphide, B.P. 96° C./1.5 mm. (Found: C, 57.8; H, 5.8. $C_9H_{11}ClS$ requires C, 57.9; H, 5.9%.)

n-Butyl p-cholorphenyl sulphide, B.P. 111° C./1 mm. (Found: C, 59.7; H, 6.45. $C_{10}H_{13}ClS$ requires C, 59.85; H, 6.6%.)

p-Chlorophenyl isopropyl sulphide, B.P. 80° C./1 mm. (Found: C, 58.0; H, 6.0. $C_9H_{11}ClS$ requires C, 57.9; H, 5.9%.)

Isobutyl p-chlorophenyl sulphide, B.P. 96° C./0.5 mm. (Found: C, 60.2; H, 7.0. $C_{10}H_{13}ClS$ requires C, 59.85; H, 6.6%.)

p-Chlorophenyl 3-methylbutyl sulphide, B.P. 114° C./1 mm. (Found: C, 61.4; H, 6.9. $C_{11}H_{15}ClS$ requires C, 61.5; H, 7.0%.)

n-Amyl p-chlorophenyl sulphide, B.P. 116° C./1.5 mm. (Found: C, 61.5; H, 7.0. $C_{11}H_{15}ClS$ requires C, 61.5; H, 7.0%.)

PREPARATION 2 tert.-Butyl p-nitrophenyl sulphone is prepared in the following manner. To a hot solution of 50 grams of tert.-butyl p-nitrophenyl sulphide in 350 cc. of glacial acetic acid there is added 80 cc. of 30% hydrogen peroxide gradually with stirring and the mixture so obtained is boiled for 1 hour. At the end of this time 500 cc. of water is added and the solution is cooled, and the solid which separates is isolated by filtration and recrystallised from alcohol. There is thus obtained tert.-butyl p-nitrophenyl sulphone in the form of a crystalline solid which has a melting point of 168–171° C. (Found: C, 49.8; H, 5.4. $C_{10}H_{13}O_4NS$ requires C, 49.9; H, 5.3%.)

In exactly similar manner the following compounds are prepared from the corresponding sulphide.

p-Chlorophenyl ethyl sulphone, M.P. 37–39° C. (Found: C, 46.6; H, 4.4. $C_8H_9O_2ClS$ requires C, 46.9; H, 4.4%.)

p-Chlorophenyl n-propyl sulphone, M.P. 43–45° C. (Found: C, 49.9; H, 5.1 $C_9H_{11}O_2ClS$ requires C, 49.5; H, 5.0%.)

n-Butyl p-chlorophenyl sulphone, M.P. 37–38° C. (Found: C, 51.4; H, 5.5. $C_{10}H_{13}O_2ClS$ requires C, 51.6; H, 5.6%.)

p-Chlorophenyl isopropyl sulphone, M.P. 92.93° C. (Found: C, 49.65; H, 5.1. $C_9H_{11}O_2ClS$ requires C, 49.4; H, 5.0%.)

Isobutyl p-chlorophenyl sulphone, M.P. 55–57° C. (Found: C, 51.8; H, 5.75. $C_{10}H_{13}O_2ClS$ requires C, 51.6; H, 5.6%.)

p-Chlorophenyl 3-methylbutyl sulphone, M.P. 42–45° C. (Found: C, 53.4; H, 6.1. $C_{11}H_{15}O_2ClS$ requires C, 53.55; H, 6.1%.)

n-Amyl p-cholorphenyl sulphone, M.P. 29–31° C. (Found: C, 53.8; H, 6.05. $C_{11}H_{15}O_2ClS$ requires C, 53.55; H, 6.08%.)

PREPARATION 3

4-Chloro-3-nitrophenyl methyl sulphone is prepared in the following manner. To a mixture of 100 grams of p-chlorophenyl methyl sulphone and 170 cc. of concentrated sulphuric acid, 170 cc. of nitric acid ($d_4^{20°}$ 1.42) is added gradually with stirring, maintaining the temperature between −10° C. and 5° C. After the addition is complete, the reaction mixture is stirred at 0° C. for 10 minutes and is then heated at 95° C. for 30 minutes. The mixture is then cooled and poured on to a large excess of ice and the solid so obtained is isolated by filtration and recrystallised from isopropanol. There is thus obtained 4-chloro-3-nitrophenyl methyl sulphone in the form of a crystalline solid which has a melting point of 120–122° C. (Found: C, 35.8; H, 2.6. $C_7H_6O_4NClS$ requires C, 35.7; H, 2.5%.)

In a similar manner the following compounds are prepared by nitration of the corresponding alkyl p-chlorophenyl sulphone or alkyl p-methylphenyl sulphone.

4-chloro-3-nitrophenyl ethyl sulphone, M.P. 99–101° C. (Found: C, 38.8; H, 3.3. $C_8H_8O_4NClS$ requires C, 38.5; H, 3.2%.)

4-chloro-3-nitrophenyl n-propyl sulphone, M.P. 79–81° C. (Found: C, 41.0; H, 4.0. $C_9H_{10}O_4NClS$ requires C, 41.0; H, 3.9%.)

n-Butyl 4-chloro-3-nitrophenyl sulphone, M.P. 41–43° C. (Found: C, 43.0; H, 4.4. $C_{10}H_{12}O_4NClS$ requires C, 43.2; H, 4.32%.)

4-chloro-3-nitrophenyl isopropyl sulphone, M.P. 69–70° C. (Found: C, 41.3; H, 3.9. $C_9H_{10}O_4NClS$ requires C, 41.0; H, 3.9%.)

Isobutyl 4-chloro-3-nitrophenyl sulphone, M.P. 44–46°

C. (Found: C, 43.4; H, 4.6. $C_{10}H_{12}O_4NClS$ requires C, 43.2; H, 4.3%.)

4-chloro-3-nitrophenyl 3-methylbutyl sulphone, M.P. 88–90° C. (Found: C, 45.2; H, 5.0. $C_{11}H_{14}O_4NClS$ requires C, 45.3; H, 4.8%.)

Ethyl 4-methyl-3-nitrophenyl sulphone, M.P. 87–90° C. (Found: C, 47.1; H, 4.8. $C_9H_{11}O_4NS$ requires C, 47.2; H, 4.8%.)

4-methyl-3-nitrophenyl n-propyl sulphone, M.P. 84–86° C. (Found: C, 49.3; H, 5.6. $C_{10}H_{13}O_4NS$ requires C, 49.4; H, 5.35%.)

n-Butyl 4-methyl-3-nitrophenyl sulphone, M.P. 60–62° C. (Found: C, 51.0; H, 5.9. $C_{11}H_{15}O_4NS$ requires C, 51.36; H, 5.8%.)

n-Amyl 4-chloro-3-nitrophenyl sulphone, M.P. 44–46° C. (Found: C, 45.4; H, 5.0. $C_{11}H_{14}O_4NClS$ requires C, 45.28; H, 4.8%.)

PREPARATION 4

3-Amino-4-chlorophenyl methyl sulphone is prepared in the following manner. A mixture of 47 grams of 4-chloro-3-nitrophenyl methyl sulphone, 60 grams of iron powder, 2 cc. of concentrated hydrochloric acid and 250 cc. of alcohol is heated under reflux for 20 hours. At the end of this time the mixture is filtered through kieselguhr and the solvent is removed by distillation. The residue is crystallised from a mixture of 80 cc. of benzene and 20 cc. of petroleum ether (boiling range 80–100° C.), and the product so obtained is recrystallised from trichloroethylene and again from 50% ethanol. There is thus obtained 3-amino-4-chlorophenyl methyl sulphone in the form of a crystalline solid which has a melting point of 99–101° C. (Found: C, 41.1; H, 3.9. $C_7H_8NO_2ClS$ requires C, 40.9; H, 3.9%.)

In a similar manner the following compounds are prepared by reduction of the corresponding alkyl 4-chloro-3-nitrophenyl sulphone or alkyl 4-methyl-3-nitrophenyl sulphone.

3-amino-4-chlorophenyl ethyl sulphone, M.P. 82–85° C. (Found: C, 44.0; H, 4.6. $C_8H_{10}O_2NClS$ requires, C, 43.7; H, 4.55%.)

3-amino-4-chlorophenyl n-propyl sulphone, M.P. 95–96° C. (Found: C, 46.3; H, 5.15. $C_9H_{12}O_2NClS$ requires C, 46.25; H, 5.1%.)

3-amino-4-chlorophenyl n-butyl sulphone, M.P. 41–43° C. (Found: C, 48.5; H, 5.6. $C_{10}H_{14}O_2NClS$ requires C, 48.5; H, 5.65%.)

3-amino-4-chlorophenyl isopropyl sulphone, M.P. 105–106° C. (Found: C, 46.4; H, 5.3. $C_9H_{12}O_2NClS$ requires C, 46.3; H, 5.1%.)

3-amino-4-chlorophenyl isobutyl sulphone, M.P. 52–55° C. (Found: C, 48.5; H, 5.6. $C_{10}H_{14}O_2NClS$ requires C, 48.5; H, 5.65%.)

3-amino-4-chlorophenyl 3-methylbutyl sulphone, M.P. 61–63° C. (Found: C, 50.2; H, 6.0. $C_{11}H_{16}O_2NClS$ requires C, 50.5; H, 6.1%.)

3-amino-4-methylphenyl methyl sulphone, M.P. 120–123° C. (Found: C, 51.8; H, 5.9. $C_8H_{11}O_2NS$ requires C, 51.9; H, 5.9%).

3-amino-4-methylphenyl ethyl sulphone, M.P. 87–89° C. (Found: C, 54.3; H, 6.5. $C_9H_{13}O_2NS$ requires C, 54.3; H, 6.5%).

3-amino-4-methylphenyl n-propyl sulphone, M.P. 121–122° C. (Found: C, 56.4; H, 7.2. $C_{10}H_{15}O_2NS$ requires C, 56.3; H, 7.0%).

p-Aminophenyl tert.-butyl sulphone, M.P. 194–195° C. (Found: C, 56.2; H, 7.2. $C_{10}H_{15}O_2NS$ requires C, 56.3; H, 7.1%).

3-amino-4-methylphenyl n-butyl sulphone, M.P. 67–70° C. (Found: C, 58.4; H, 7.7. $C_{11}H_{17}O_2NS$ requires C, 58.15; H, 7.4%).

3-amino-4-chlorophenyl n-amyl sulphone, M.P. 67–69° C. (Found: C, 50.5; H, 5.8. $C_{11}H_{16}O_2NClS$ requires C, 50.5; H, 6.1%).

PREPARATION 5

Tert.-butyl p-nitrophenyl sulphide is prepared in the following manner. A mixture of 220 cc. of concentrated sulphuric acid and 125 cc. of water is cooled to 0° C. in ice and 47 cc. of tert.-butanol is added. The mixture so obtained is well stirred and 68 grams of p-nitrobenzene thiol is added portionwise. When addition is complete the mixture is allowed to reach room temperature and it is then stirred for 5½ hours. The mixture is then diluted with an equal volume of ice-cold water, filtered and extracted with ether (3 x 200 cc.). The ether extracts are combined, evaporated to dryness and the residue recrystallised from methanol. There is thus obtained tert.-butyl p-nitrophenyl sulphide in the form of a crystalline solid which has a melting point of 35–38° C. (Found: C, 56.5; H, 6.2. $C_{10}H_{13}O_2NS$ requires C, 56.9; H, 6.2%).

PREPARATION 6 p-(1-methylbutyl)sulphonylaniline which is employed in the preparation of p-(1-methylbutyl)sulphonylphenyl isothiocyanate is prepared in the following manner. A mixture of 30.2 grams of 2-bromopentane, 39.8 grams of p-acetamidobenzene sulphinic acid, 8 grams of sodium hydroxide, 10 cc. of water and 75 cc. of alcohol is heated under reflux for 30 hours. The alcohol is removed by distillation and the residue is boiled for 10 minutes with an excess of 6 N hydrochloric acid. The clear solution thus obtained is neutralised by the addition of sodium hydroxide solution and the precipitate so produced is recrystallised from methanol and again from benzene. There is thus obtained p-(1-methylbutyl)sulphonylaniline in the form of a crystalline solid which has a melting point of 139–140° C. (Found: C, 58.5; H, 7.8. $C_{11}H_{17}O_2NS$ requires C, 58.15; H, 7.9%).

PREPARATION 7 p-Aminophenyl dichloromethyl sulphone is prepared as follows. A mixture of 60 grams of p-acetamidobenzenesulphinic acid, 200 cc. of water, 12 grams of sodium hydroxide and 30 cc. of alcohol-free chloroform is heated under reflux for 24 hours. The mixture is then cooled and the solid which separates is isolated by filtration and recrystallised from alcohol. There is thus obtained p-acetamidophenyl dichloromethyl sulphone in the form of a crystalline solid which has a melting point of 178–182° C. (Found: C, 38.4; H, 3.4. $C_9H_9O_3NCl_2S$ requires C, 38.3; H, 3.2%). This compound is hydrolysed by boiling for 10 minutes with an excess of 6 N hydrochloric acid. The clear solution so obtained is neutralised by the addition of sodium hydroxide solution and the solid which separates is isolated by filtration and recrystallised from aqueous alcohol. There is thus obtained p-aminophenyl dichloro-methyl sulphone in the form of a crystalline solid which has a melting point of 94–98° C. (Found: C, 34.95; H, 3.0. $C_7H_7O_2NCl_2S$ requires C, 35.0; H, 2.9%).

Using methylene dibromide in place of chloroform the following compounds are prepared in exactly similar manner.

p-(Bromomethyl)sulphonylacetanilide, M.P. 202–210° C. (Found: C, 37.3; H, 3.4. $C_9H_{10}O_3NBrS$ requires C, 37.0; H. 3.4%).

p-(Bromomethyl)sulphonylaniline, M.P. 122–125° C. (Found: C, 33.6; H, 3.3. $C_7H_8O_2NBrS$ requires C, 33.6; H, 3.2%).

PREPARATION 8 p-Chlorobenzyl p-aminophenyl sulphone is prepared in the following manner. To a solution of 4 grams of sodium hydroxide in a mixture of 5 cc. of water and 75 cc. of alcohol, there is added 19.9 grams of p-acetamidobenzene sulphinic acid and 18 grams of n-chlorobenzyl chloride. The mixture so obtained is heated under reflux overnight and the reaction mixture allowed to cool. The solid so produced is isolated by filtration and recrystallised from acetic acid and again from Cellosolve. There is thus obtained p-chlorobenzyl p-acetamidophenyl sulphone in the form of a crystalline solid which has a melting point of 256–261° C. (Found: C, 55.2; H, 4.4. $C_{15}H_{14}O_3NClS$ requires C, 55.6; H, 4.3%). This material is heated under reflux for 10 hours with 100 cc. of 6 N hydrochloric acid. The suspension thus obtained is neutralised by the addition of sodium hydroxide solution and the precipitate so produced is recrystallised twice from Cellosolve. There is thus obtained p-chlorobenzyl p-aminophenyl sulphone in the form of a crystalline solid which has a melting point of 275–280° C. (Found: C, 55.6; H, 4.3. $C_{13}H_{12}O_2NClS$ requires C, 55.4; H, 4.3%).

The following non-limitative examples illustrate the invention.

Example 1.—In the preparation of p-methylsulphonylphenyl isothiocyanate a mixture of 9.5 cc. of thiophosgene, 15.9 grams of p-aminophenyl methyl sulphone and 100 cc. of dry alcohol-free chloroform is heated under reflux for 18 hours. At the end of this time the small amount of solid present in the reaction product is removed by filtration and the volume of the filtrate is reduced to about 40 cc. by distillation. To the concentrated filtrate so obtained there is added 20 cc. of petroleum ether (boiling range 60–80° C.) and the solution is allowed to crystallise. The crystalline solid which results is recrystallised from 50 cc. of a mixture of two volumes of chloroform and one volume of petroleum ether (boiling range 60–80° C.). There is thus obtained p-methylsulphonylphenyl isothiocyanate in the form of a crystalline solid which has a melting point of 128–130° C. (Found: C, 44.9; H, 3.2. $C_8H_7O_2NS_2$ requires C, 45.1; H, 3.3%.)

Example 2.—(a) In the preparation of p-isopropylsulphonylphenyl isothiocyanate, a solution of 10.5 cc. of thiophosgene in 100 cc. of chloroform is added to a suspension of 19.9 grams of p-isopropylsulphonylaniline in 50 cc. of 2 N hydrochloric acid with vigorous agitation. Potassium carbonate is added to the mixture with continued agitation until the aqueous layer is permanently neutral. The chloroform layer is separated, dried over anhydrous sodium sulphate and evaporated to dryness. The residue is recrystallised from petroleum ether (boiling range 60–80° C.). There is thus obtained p-isopropylsulphonylphenyl isothiocyanate in the form of a crystalline solid which has a melting point of 107–108° C. (Found: C, 49.5; H, 4.2; N, 6.1. $C_{10}H_{11}O_2NS_2$ requires C, 49.8; H, 4.6; N, 5.8%).

In exactly similar manner using the appropriately substituted aniline, there are prepared the following compounds.

p-n-Butylsulphonylphenyl isothiocyanate, M.P. 70–74° C. (Found: C, 51.8; H, 5.1. $C_{11}H_{13}O_2NS_2$ requires C, 51.8; H, 5.1%).

p-n-Propylsulphonylphenyl isothiocyanate, M.P. 88.5–90.5° C. (Found: C, 49.4; H, 4.8. $C_{10}H_{11}O_2NS_2$ requires C, 49.8; H, 4.6%).

p-Sec.-butylsulphonylphenyl isothiocyanate, M.P. 58–61° C. (Found: C, 51.4; H, 4.9. $C_{11}H_{13}O_2NS_2$ requires C, 51.8; H, 5.1%).

p-n-Amylsulphonylphenyl isothiocyanate, M.P. 88–92° C. (Found: C, 53.6; H, 5.4. $C_{12}H_{15}O_2NS_2$ requires C, 53.5; H, 5.6%).

p-Allylsulphonylphenyl isothiocyanate, M.P. 93–94.5° C. (Found: C, 50.4; H, 4.0. $C_{10}H_9O_2NS_2$ requires C, 50.2; H, 3.8%).

p-(3-methylbutyl)sulphonylphenyl isothiocyanate, M.P. 98–101° C. (Found: C, 53.9; H, 5.6 $C_{12}H_{15}O_2NS_2$ requires C, 53.5; H, 5.6%).

p-n-Octylsulphonylphenyl isothiocyanate, M.P. 73° C. (Found: C, 58.3; H, 6.8. $C_{15}H_{21}O_2NS_2$ requires C, 57.9; H, 6.7%).

p-Isobutylsulphonylphenyl isothiocyanate, M.P. 59–62° C. (Found: C, 51.8; H, 5.0. $C_{11}H_{13}O_2NS_2$ requires C, 51.8; H, 5.1%).

p-n-Hexylsulphonylphenyl isothiocyanate, M.P. 68–71° C. (Found: C, 54.8; H, 6.1. $C_{13}H_{17}O_2NS_2$ requires C, 55.1; H, 6.0%).

p-n-Heptylsulphonylphenyl isothiocyanate, M.P. 80–83° C. (Found: C, 56.7; H, 6.4. $C_{14}H_{19}O_2NS_2$ requires C, 56.6; H, 6.4%).

p-Cetylsulphonylphenyl isothiocyanate, M.P. 82–88° C. (Found: C, 65.1; H, 8.9. $C_{23}H_{37}O_2NS_2$ requires C, 65.2; H, 8.75%).

p-Benzylsulphonylphenyl isothiocyanate, M.P. 131–134° C. (Found: C, 58.1; H, 3.6. $C_{14}H_{11}O_2NS_2$ requires C, 58.1; H, 3.8%).

p-(3-chloroallyl)sulphonylphenyl isothiocyanate, M.P. 107° C. (Found: C, 43.5; H, 3.0. $C_{10}H_8O_2NClS_2$ requires C, 43.9; H, 2.9%).

p-Acetonylsulphonylphenyl isothiocyanate, M.P. 110–112° C. (Found: C, 46.9; H, 3.4. $C_{10}H_9O_3NS_2$ requires C, 47.1; H, 3.5%).

p-(2-phenylethyl)sulphonylphenyl isothiocyanate, M.P. 102–104° C. (Found: C, 59.4; H, 4.3. $C_{15}H_{13}O_2NS_2$ requires C, 59.4; H, 4.3%).

p-Tert.-butylsulphonylphenyl isothiocyanate, M.P. 99–101° C. (Found: C, 52.1; H, 4.9. $C_{11}H_{13}O_2NS_2$ requires C, 51.8; H, 5.1%).

4-chloro-3-isothiocyanatophenyl methyl sulphone, M.P. 110–112° C. (Found: C, 39.1; H, 2.7; N, 5.9. $C_8H_6O_2NClS_2$ requires C, 38.8; H, 2.5; N, 5.7%).

p-(1-methylbutyl)sulphonylphenyl isothiocyanate, M.P. 56–59° C. (Found: C, 53.4; H, 5.6 $C_{12}H_{15}O_2NS_2$ requires C, 53.5; H, 5.6%).

4-chloro-3-isothiocyanatophenyl ethyl sulphone, M.P. 68° C. (Found: C, 41.3; H, 3.2. $C_9H_8O_2NClS_2$ requires C, 41.3; H, 3.1%).

4-chloro-3-isothiocyanatophenyl n-propyl sulphone, M.P. 77–79° C. (Found: C, 43.4; H, 3.8. $C_{10}H_{10}O_2NClS_2$ requires C, 43.5; H, 3.6%).

n-Butyl 4-chloro-3-isothiocyanatophenyl sulphone, M.P. 53–54° C. (Found: C, 45.9; H, 4.2. $C_{11}H_{12}O_2NClS_2$ requires C, 45.6; H, 4.1%).

4-chloro-3-isothiocyanatophenyl isopropyl sulphone, M.P. 71–73° C. (Found: C, 43.7; H, 3.9 $C_{10}H_{10}O_2NClS_2$ requires C, 43.5; H, 3.6%).

Isobutyl 4-chloro-3-isothiocyanatophenyl sulphone, M.P. 99–101° C. (Found: C, 45.4; H, 4.1. $C_{11}H_{12}O_2NClS_2$ requires C, 45.6; H, 4.1%).

4-chloro-3-isothiocyanatophenyl 3-methylbutyl sulphone, M.P. 85° C. (Found: C, 47.4; H, 4.9. $C_{12}H_{14}O_2NClS_2$ requires C, 47.4; H, 4.6%).

m-Methylsulphonylphenyl isothiocyanate, M.P. 77–78° C. Found: C, 45.5; H, 3.4. $C_8H_7O_2NS_2$ requires C, 45.1; H, 3.3%).

2-methyl-5-methylsulphonylphenyl isothiocyanate, M.P. 120–122° C. (Found: C, 47.8; H, 4.1. $C_9H_9O_2NS_2$ requires C, 47.6; H, 4.0%).

Ethyl 4-methyl-3-isothiocyanatophenyl sulphone, M.P. 76–77° C. (Found: C, 49.6; H, 4.6. $C_{10}H_{11}O_2NS_2$ requires C, 49.8; H, 4.6%).

4-methyl-3-isothiocyanatophenyl n-propyl sulphone, M.P. 69° C. (Found: C, 51.9; H, 5.2. $C_{11}H_{13}O_2NS_2$ requires C, 51.8; H, 5.1%).

p-Dichloromethylsulphonylphenyl isothiocyanate, M.P. 108–112° C. (Found: C, 34.1; H, 1.8. $C_8H_5O_2NCl_2S_2$ requires C, 34.0; H, 1.8%).

p-(2-chloroethyl)sulphonylphenyl isothiocyanate, M.P. 126–128° C. (Found: C, 41.7; H, 3.2. $C_9H_8O_2NClS_2$ requires C, 41.3; H, 3.1%).

p-(Bromomethyl)sulphonylphenyl isothiocyanate, M.P. 145–152° C. (Found: C, 33.15; H, 2.3. $C_8H_6O_2NBrS_2$ requires C, 32.9; H, 2.1%).

p-(1:1-dimethyl-3-oxobutyl)sulphonylphenyl isothiocyanate, M.P. 121–125° C. (Found: C, 52.4; H, 5.0. $C_{13}H_{15}O_3NS_2$ requires C, 52.5; H, 5.1%).

N-Amyl 4-chloro-3-isothiocyanatophenyl sulphone, M.P. 54–56° C. (Found: C, 47.6; H, 4.6. $C_{12}H_{14}O_2NClS_2$ requires C, 47.4; H, 4.6%).

n-Butyl 4-methyl-3-isothiocyanatophenyl sulphone, M.P. 45–46° C. (Found: C, 53.1; H, 5.5. $C_{12}H_{15}O_2NS_2$ requires C, 53.53; H, 5.6%).

(b) In the preparation of p-3-(methylbutyl)sulphonylphenyl isothiocyanate 12.5 cc. of redistilled trichloromethane sulphenyl chloride is added slowly to a stirred mixture of 22.7 grams of p-3-methylbutylsulphonylaniline, 100 cc. of alcohol-free chloroform, 33.8 grams of stannous chloride, 105 cc. of 2 N hydrochloric acid and 195 cc. of water. The reaction mixture is stirred for 3 hours, filtered through kieselguhr to break the emulsion and the layers separated. The aqueous layer is washed with 50 cc. of alcohol-free chloroform and the combined chloroform solutions are dried over anhydrous sodium sulphate. The chloroform is removed by distillation under reduced pressure and the residue is slurried with 100 cc. of petroleum ether (boiling range 60–80° C.), isolated by filtration and recrystallised from petroleum ether (boiling range 80–100° C.). There is thus obtained p-(3-methylbutyl)sulphonylphenyl isothiocyanate which is identical with the compound listed above as prepared in a manner similar to the method described in (a) above.

In exactly similar manner starting from p-n-amylsulphonylaniline there is obtained p-n-amylsulphonylphenyl isothiocyanate which is identical with the compound listed above as prepared in a manner similar to the method described in (a) above.

*Example 3.*—In the preparation of p-(chloromethyl)-sulphonylphenyl isothiocyanate a solution of 4.5 cc. of thiophosgene in 50 cc. of chloroform is added to a suspension of 10.5 grams of p-(chloromethyl)sulphonylaniline in 25 cc. of 2 N hydrochloric acid with stirring. Potassium carbonate is added to the mixture so obtained with continued stirring until the aqueous layer is permanently neutral. The chloroform layer is separated, dried over anhydrous sodium sulphate and evaporated to dryness. The residue is recrystallised from petroleum ether (boiling range 100–120° C.) and again from trichloroethylene. There is thus obtained p-(chloromethyl)sulphonylphenyl isothiocyanate in the form of a crystalline solid which has a melting point of 140–144° C. (Found: C, 39.0; H, 2.5. $C_8H_6O_2NClS_2$ requires C, 38.8; H, 2.5%).

In exactly similar manner using p-phenacylsulphonylaniline in place of p-(chloromethyl)sulphonylaniline, there is obtained p-phenacylsulphonylphenyl isothiocyanate in the form of a crystalline solid which has a melting point of 124–127° C. (Found: C, 56.4; H, 3.5. $C_{15}H_{11}O_3NS_2$ requires C, 56.7; H, 3.4%).

*Example 4.*—In the preparation of p-chlorobenzyl p-isothiocyanatophenyl sulphone a mixture of 11 grams of p-chlorobenzyl p-aminophenyl sulphone, 3.5 cc. of thiophosgene and 100 cc. of dry, alcohol-free chloroform is heated under reflux for 48 hours. At the end of this time the small amount of solid in the reaction mixture is removed by filtration and the filtrate is evaporated to dryness. The residue is recrystallised twice from trichloroethylene. There is thus obtained p-chlorobenzyl p-isothiocyanatophenyl sulphone in the form of a crystalline solid which has a melting point of 172–176° C. (Found: C, 52.0; H, 3.3. $C_{14}H_{10}O_2NClS_2$ requires C, 51.9; H, 3.1%).

*Example 5.*—In the preparation of a dispersible powder, 20 parts by weight of p-methylsulphonylphenyl isothiocyanate is intimately mixed with 8 parts by weight of Belloid T.D. (a condensate of formaldehyde and an alkyl aryl sulphonate) and 72 parts by weight of kaolin. This composition may be added to water to form a dispersion suitable for horticultural use.

*Example 6.*—In the preparation of a fungicidal dust, 5 parts by weight of p-methylsulphonylphenyl isothiocyanate is intimately mixed with 95 parts by weight of kaolin.

Compositions similar to those described in Examples 5 and 6 may be prepared in which the active ingredient specifically mentioned is replaced by any of the compounds listed in Examples 2, 3 and 4.

*Example 7.*—In the preparation of a composition suitable for dispersion as an aerosol sufficient p-methylsulphonylphenyl isothiocyanate is dissolved in a mixture of 5 parts of arachis oil and 95 parts of substantially anhydrous acetone to obtain a solution which contains 5% w./v. of active ingredient.

This composition is readily dispersed as an aerosol by mechanical means, for example, by the use of a paint spray gun.

Compositions may be prepared in a similar manner in which the active ingredient is one of the following compounds.

4-chloro-3-isothiocyanatophenyl methyl sulphone.
p-n-Propylsulphonylphenyl isothiocyanate.
p-n-Butylsulphonylphenyl isothiocyanate.
p-Sec.-butylsulphonylphenyl isothiocyanate.
p-n-Amylsulphonylphenyl isothiocyanate.
p-Allylsulphonylphenyl isothiocyanate.
p-3-methylbutylsulphonylphenyl isothiocyanate.
p-n-Hexylsulphonylphenyl isothiocyanate.
p-Benzylsulphonylphenyl isothiocyanate.
p-3-chloroallylsulphonylphenyl isothiocyanate.
p-Phenacylsulphonylphenyl isothiocyanate.
p-Chloromethylsulphonylphenyl isothiocyanate.
p-Chlorobenzyl p-isothiocyanatophenyl sulphone.

*Example 8.*—In the preparation of a composition suitable for dispersion as an aerosol, sufficient p-methylsulphonylphenyl isothiocyanate is dissolved in substantially anhydrous acetone to obtain a solution which contains 5% w./v. of active ingredient.

This composition is readily dispersed as an aerosol by mechanical means, for example, by the use of a paint spray gun. Compositions similar to that described in Example 8 may be prepared in which the active ingredient specifically mentioned is replaced by a compound listed in Examples 2, 3 and 4, with the exception of p-cetylsulphonylphenyl isothiocyanate which is not sufficiently soluble in acetone.

*Example 9.*—In the preparation of a dispersible powder, 10 parts by weight of p-n-amylsulphonylphenyl isothiocyanate is intimately mixed with 8 parts by weight of Belloid T.D. (a condensate of formaldehyde and an alkyl aryl sulphonate) and 82 parts by weight of kaolin. This composition may be added to water to form a dispersion suitable for horticultural use.

In a similar manner compositions may be prepared in which the active ingredient specifically mentioned is replaced by one of the following compounds.

p-n-Hexylsulphonylphenyl isothiocyanate.
p-3-methylbutylsulphonylphenyl isothiocyanate.
p-Chloromethylsulphonylphenyl isothiocyanate.
p-Phenacylsulphonylphenyl isothiocyanate.
p-Benzylsulphonylphenyl isothiocyanate.
p-n-Propylsulphonylphenyl isothiocyanate.
p-Chlorobenzyl p-isothiocyanatophenyl sulphone.
4-chloro-3-isothiocyanatophenyl methyl sulphone.

*Example 10.*—In the preparation of a dispersible powder 10 parts by weight of p-n-amylsulphonylphenyl isothiocyanate is intimately mixed with 8 parts by weight of Belloid T.D., 5 parts by weight of Nansa S (the sodium salt of an alkylarylsulphonic acid) and 77 parts by weight of kaolin. This composition may be added to water to form a dispersion suitable for horticultural use.

In a similar manner compositions may be prepared in which the active ingredient specifically mentioned is replaced by one of the following compounds.

p-n-Hexylsulphonylphenyl isothiocyanate.
p-3-methylbutylsulphonylphenyl isothiocyanate.

*Example 11.*—In the preparation of a composition suitable for dilution with water to produce a stable dispersion, sufficient p-methylsulphonylphenyl isothiocyanate is dissolved in a mixture of 1 part volume of Ethylan C.P. (a polyethylene oxide condensate of an octylphenol) and 100 parts by volume of substantially anhydrous acetone to obtain a solution which contains 10% w./v. of active ingredient.

Similar compositions may be prepared which contain one of the following compounds as active ingredient.

p-n-Propylsulphonylphenyl isothiocyanate.
p-n-Butylsulphonylphenyl isothiocyanate.
p-n-Amylsulphonylphenyl isothiocyanate.
p-n-Hexylsulphonylphenyl isothiocyanate.
p-n-Heptylsulphonylphenyl isothiocyanate.
p-3-methylbutylsulphonylphenyl isothiocyanate.
p-Isobutylsulphonylphenyl isothiocyanate.
p-Chloromethylsulphonylphenyl isothiocyanate.
p-Benzylsulphonylphenyl isothiocyanate.
p-Phenacylsulphonylphenyl isothiocyanate.
4-Chloro-3-isothiocyanatophenyl methyl sulphone.

*Example 12.*—In the preparation of a composition suitable for dilution with water to produce a stable emulsion, sufficient p-n-amylsulphonylphenyl isothiocyanate is dissolved in a mixture of 10 parts by volume of Ethylan S.E. (a proprietary emulsifying agent which is a mixture of lauric diethanolamide and a polyethylene oxide condensate of octylphenol) and 90 parts by volume of benzene to obtain a solution which contains 20% w./v. of active ingredient.

In a similar manner compositions may be prepared which contain as active ingredient p-3-methylbutylsulphonylphenyl isothiocyanate. Alternatively similar compositions may be prepared in which toluene is substituted for benzene.

We claim:

1. An organic isothiocyanate having the general formula

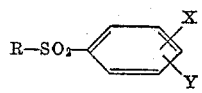

in which X represents an isothiocyanate radical, Y is selected from the group consisting of a hydrogen atom, a chlorine atom and lower alkyl radicals, and R is selected from the group consisting of lower alkenyl radicals, chlorinated lower alkenyl radicals, alkyl radicals containing from 3 to 7 carbon atoms, chlorinated lower alkyl radicals, brominated lower alkyl radicals, phenyl lower alkyl radicals, chlorinated-phenyl lower alkyl radicals, the acetonyl radical, the phenacyl radical and the 1,1-dimethyl 3-oxobutyl radical.

2. An organic isothiocyanate having the general formula

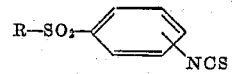

wherein R is lower alkenyl.

3. An organic isothiocyanate having the general formula

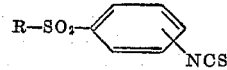

wherein R is alkyl containing from 3 to 7 carbon atoms.

4. An organic isothiocyanate having the general formula

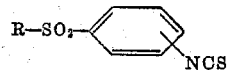

wherein R is phenyl lower alkyl.

5. An organic isothiocyanate having the general formula

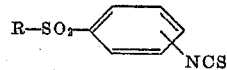

wherein R is chlorophenyl lower alkyl.

6. p-n-Amylsulphonylphenyl isothiocyanate.
7. p-(3-methylbutyl)sulphonylphenyl isothiocyanate.
8. p-(4-chlorobenzyl)sulphonylphenyl isothiocyanate.
9. p-Benzylsulphonylphenyl isothiocyanate.
10. p-(Chloromethyl)sulphonylphenyl isothiocyanate.

References Cited in the file of this patent

UNITED STATES PATENTS

| | | |
|---|---|---|
| 2,042,600 | Hilger | June 2, 1936 |
| 2,218,030 | Pohls et al. | Oct. 15, 1940 |
| 2,339,050 | Carson | Jan. 11, 1944 |
| 2,370,405 | Kaase | Feb. 27, 1945 |
| 2,394,915 | Jones | Feb. 12, 1946 |
| 2,428,843 | Georges | Oct. 14, 1947 |
| 2,749,268 | Newcomer | June 5, 1956 |
| 2,785,101 | Urbschat | Mar. 12, 1957 |
| 2,785,190 | Klopping | Mar. 12, 1957 |

FOREIGN PATENTS

| | | |
|---|---|---|
| 481,733 | Great Britain | Mar. 11, 1938 |

OTHER REFERENCES

Chemical Abstracts (32) 1938, page 518 (5) abstract of article by A. E. Kretav et al.

Heymann et al.: J. Am. Chem. Soc., vol. 67, pp. 1979–1986 (1945).